United States Patent [19]
Myers et al.

[11] Patent Number: 5,893,640
[45] Date of Patent: Apr. 13, 1999

[54] FOOD MIXER WITH REMOVABLE SPLASH GUARD

[75] Inventors: Terry L. Myers; Stacey R. Just, both of Richmond, Va.; Craig A. Hidalgo, Levittown, Pa.

[73] Assignee: Hamilton Beach/Proctor-Silex, Inc., Glen Allen, Va.

[21] Appl. No.: 08/893,839

[22] Filed: Jul. 11, 1997

[51] Int. Cl.⁶ ............................................. B01F 15/00
[52] U.S. Cl. .............................. 366/129; 366/347
[58] Field of Search ........................ 366/129, 130, 366/197–204, 242–251, 344, 347; D7/387, 391

[56] References Cited

U.S. PATENT DOCUMENTS

| | | | |
|---|---|---|---|
| D. 381,863 | 8/1997 | Vineis . | |
| 1,233,823 | 7/1917 | Tiger et al. | 366/347 |
| 2,193,356 | 3/1940 | Green | 366/347 |
| 2,504,727 | 4/1950 | Post . | |
| 2,517,648 | 8/1950 | Franke | 366/347 |
| 2,681,211 | 6/1954 | Reynolds | 366/347 |
| 2,802,499 | 8/1957 | Tupper . | |
| 2,858,118 | 10/1958 | Perkins . | |
| 3,913,896 | 10/1975 | Hawke | 366/347 |
| 3,960,370 | 6/1976 | Bewley | 366/347 |
| 4,549,811 | 10/1985 | Schliffner et al. . | |
| 4,822,175 | 4/1989 | Barnard et al. . | |
| 5,332,310 | 7/1994 | Wells | 366/129 |
| 5,414,945 | 5/1995 | Freeman et al. . | |
| 5,439,289 | 8/1995 | Neilson . | |
| 5,512,728 | 4/1996 | Jalbert . | |
| 5,526,596 | 6/1996 | Bitzel et al. . | |
| 5,556,203 | 9/1996 | Filias | 366/129 |

*Primary Examiner*—Charles E. Cooley
*Attorney, Agent, or Firm*—Roger S. Dybvig

[57] ABSTRACT

A splash guard is provided for a food mixer, such as a hand-held mixer or a stand mixer, comprising a wavy, plate-like member that is adapted to cover the opening of a mixing bowl. The splash guard is secured to the mixer by portions of the splash guard that mate with the sides of the mixer body. More particularly, the splash guard has mutually-opposed flanges that are received in outwardly-open, longitudinally-extending grooves formed in the sides of the mixer body. The grooves in the mixer body can be specially provided for mounting the splash guard or they can be formed in a conventional manner at the junction of two body parts secured together to form the mixer body. The splash guard includes a transverse retainer strap that gives rigidity to the splash guard structure. Snap-fitting and sliding methods of assembling the splash guard onto the mixer body are also disclosed.

16 Claims, 7 Drawing Sheets

FOOD MIXER WITH REMOVABLE SPLASH GUARD

FIELD OF THE INVENTION

This invention relates to an electric food mixer having a splash guard and, more particularly, to a removable splash guard that is directly attached to the body of the mixer.

BACKGROUND OF THE INVENTION

A common problem that arises in the use of a food mixing device, such as a hand-held mixer or a stand mixer, is the splashing or splattering of ingredients from the mixing bowl during mixing. Such splattering creates an undesirable mess that must be cleaned up after mixing is completed. It is known in the art to provide a splash guard substantially covering the opening of the mixing bowl to prevent ingredients from being splashed or splattered from the bowl during mixing, but such known splash guards have various disadvantages.

Known splash guards can be separated into two categories—those that are attached to the motor housing or body of the mixer and those that are not attached to the mixer body. Splash guards that are not attached to the mixer, such as shown in U.S. Pat. Nos. 5,439,289, 4,549,811, 3,960,370, and 3,913,896, usually comprise a disk-shaped plate or the like that is placed atop a mixing bowl and have the disadvantage that they must generally be held in place during use. However, the mixing process may require rotation of the mixing bowl to achieve a satisfactory mix, which may be difficult to obtain (especially using a hand-held mixer) when simultaneously trying to hold the splash guard in place.

Splash guards that are attached to the mixer body, such as shown in U.S. Pat. Nos. 5,556,203 and 2,193,356, overcome the aforementioned problem, but have disadvantages of their own. For example, the splash guard shown in the U.S. Pat. No. 5,556,203 patent utilizes a hook-and-loop fastener to secure the splash guard to the mixer body. Such a hook-and-loop fastener will likely deteriorate after repeated use, and securely connecting the splash guard to the mixer body will become increasingly difficult as the fastener deteriorates. In addition, a fabric fastener such as a hook-and-loop fastener can easily become soiled by ingredients splattered from the mixing bowl, resulting in an unsanitary mixing environment that will not likely meet the standards of the National Sanitation Foundation (NSF).

Another problem present in known splash guards is that they typically have a surface which confronts the bottom surface of mixer body, which generally requires the provision of slots or openings in the splash guard through which the rotatable beaters or mixing elements of the mixer extend. Because portions of the splash guard are located in close proximity to the mixing elements, the mixing elements may inadvertently contact the splash guard during mixing if the splash guard is not securely fixed relative to the mixer body. Contact between the rotating mixing elements and the splash guard may cause the splash guard to be chipped or otherwise damaged, which can create a hazardous condition.

Therefore, the need exists for a splash guard that is easily and securely attached to a mixer body by means that will not deteriorate appreciably due to repeated uses, that will not permit the splash guard to disengage from the mixer during mixing, and that will not tend to result in an unsanitary mixing environment.

SUMMARY OF THE INVENTION

An object of this invention is to provide a mixer splash guard that is easily and securely attached to the body of a mixer. A related object of this invention is to provide a splash guard that is secured to the body of a mixer by means that are not likely to lead to an unsanitary mixing environment.

Another object of this invention is to provide a splash guard that is securely attached to the body of a mixer in a manner such that the splash guard will not tend to become disengaged from the mixer body during the mixing process. A related object is to provide such a splash guard that cannot be disengaged from the mixer body while rotatable mixing elements are mounted to the mixer body.

Yet another object of this invention is to provide a mixer splash guard that can be easily and securely attached to a mixer body of known construction with little or no modification to the mixer body.

A further object of this invention is to provide a mixer splash guard that can be readily cleaned, as by hand washing or machine washing, without concern that the splash guard will be damaged by such cleaning.

Still another object of this invention is to provide a splash guard in accordance with the foregoing objects that is compact, durable, inexpensively manufactured, and has a pleasing ornamental appearance.

A splash guard in accordance with this invention comprises a splash-blocking portion in the form of a wavy, plate-like member that is adapted to cover at least a portion of the opening of a mixing bowl. The splash guard is secured to the motor housing or body of a mixer by portions of the splash guard that mate with the sides of the mixer body. More particularly, the splash guard has a mounting arrangement comprising mutually-opposed flanges that are either snapped into or slidably received in outwardly-open, longitudinally-extending grooves formed in the respectively opposite sides of the mixer body. The grooves in the mixer body can be specially provided for mounting the splash guard or they can be formed, as common in known mixers, at the junction of two body parts secured together to form the mixer body, the latter construction permitting the splash guard to be constructed for use with a variety of known mixer bodies with little or no modification to the mixer body itself.

The splash guard mounting arrangement in accordance with this invention is useful with various different splash guard configurations other than the aforementioned wavy-plate configuration. For example, the splash-blocking portion of the splash guard may also comprise a simple planar disk configuration or an inverted, cup-like configuration, which are known in the art. The mounting arrangement is preferably integrally formed with the splash-blocking portion of the splash guard, regardless of its configuration.

The foregoing and other objects and advantages of this invention will become apparent from the following description and the accompanying drawings.

BRIEF DESCRIPTION OF THE DRAWING

FIG. 2 also shows a pair of mixing elements forming a part of the mixer in position to be assembled onto the mixer body.

3

DETAILED DESCRIPTION

Figure 1:
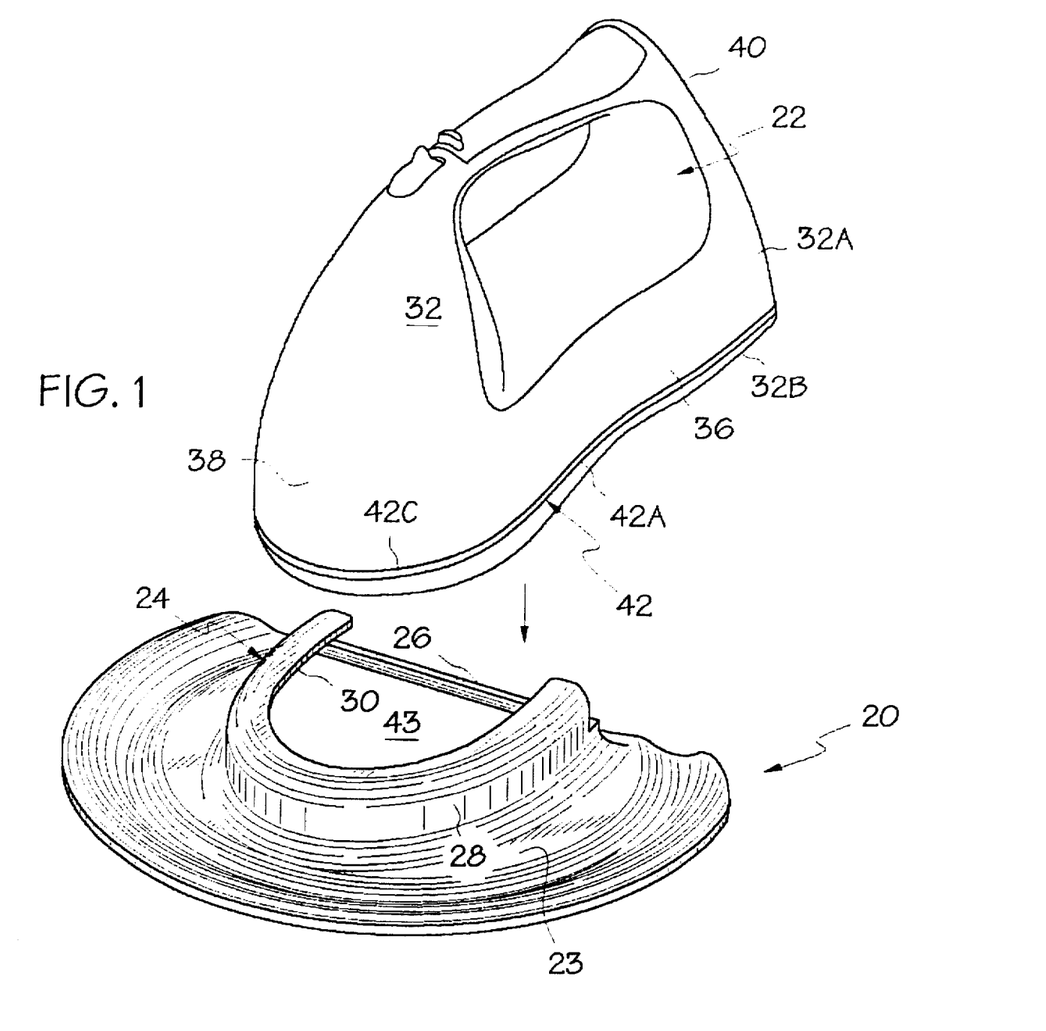
FIG. 1 is a perspective view showing the motor housing or body of a hand-held electric mixer and a splash guard therefor in accordance with this invention. The mixer body and the splash guard are shown disassembled in FIG. 1.

FIG. 1 of the drawings illustrates a splash-guard, generally designated 20, in accordance with this invention and the motor housing or body 32 of a conventional hand-held mixer 22 to which the splash-guard 20 can be mounted. The splash guard 20 is best illustrated in FIGS. 7 through 12 of the drawings and comprises a plate-like, generally semicircular splash-blocking portion 23 and a mounting arrangement, generally designated 24, integrally formed therewith. The splash-blocking portion 23 of the splash guard 20 is dimensioned to cooperate with the mixer body 32, as described below, to substantially cover the upper openings of mixing bowls (not shown) having a variety of different diameters.

Figure 8:
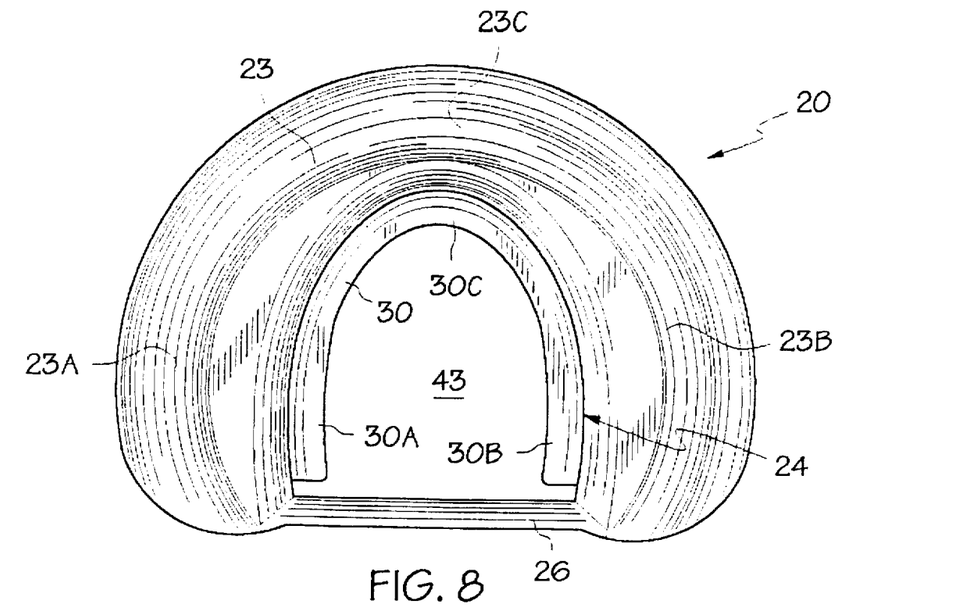
FIG. 8 is a bottom plan view of the splash guard.
Figure 9:
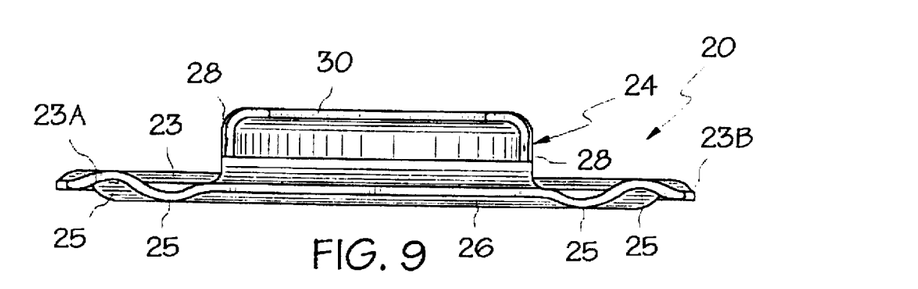
FIG. 9 is a rear elevational view of the splash guard.
Figure 10:
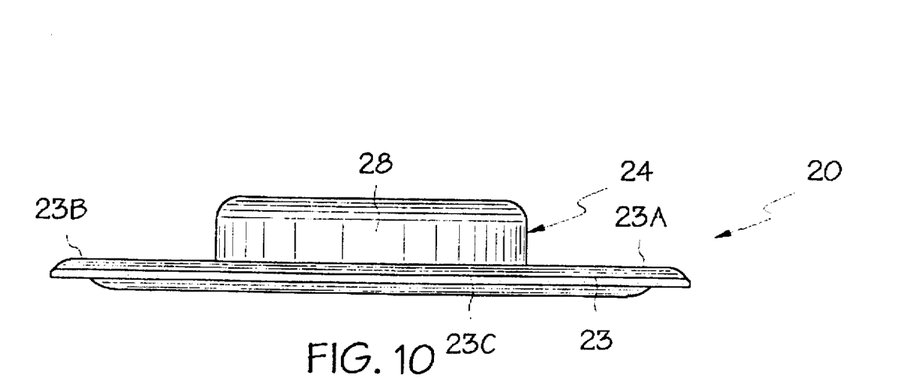
FIG. 10 is a front elevational view of the splash guard.
Figure 11:
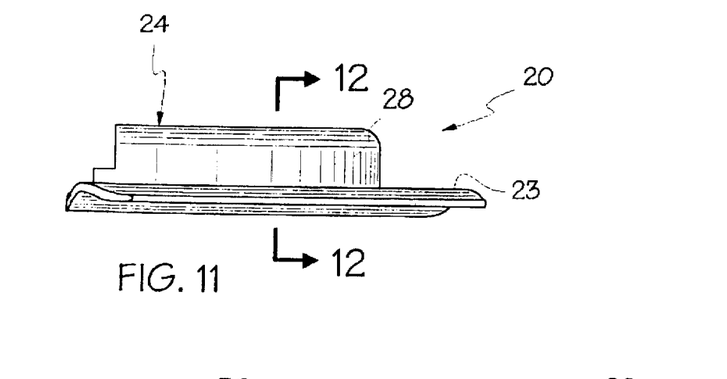
FIG. 11 is a right side elevational view of the splash guard, the left side being a mirror image of the right side.
Figure 12:
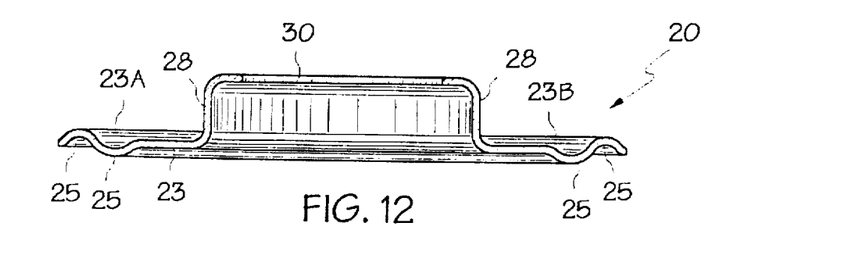
FIG. 12 is a cross-sectional view of the splash guard taken along line 12—12 of FIG. 11.
Figures 13, 14:
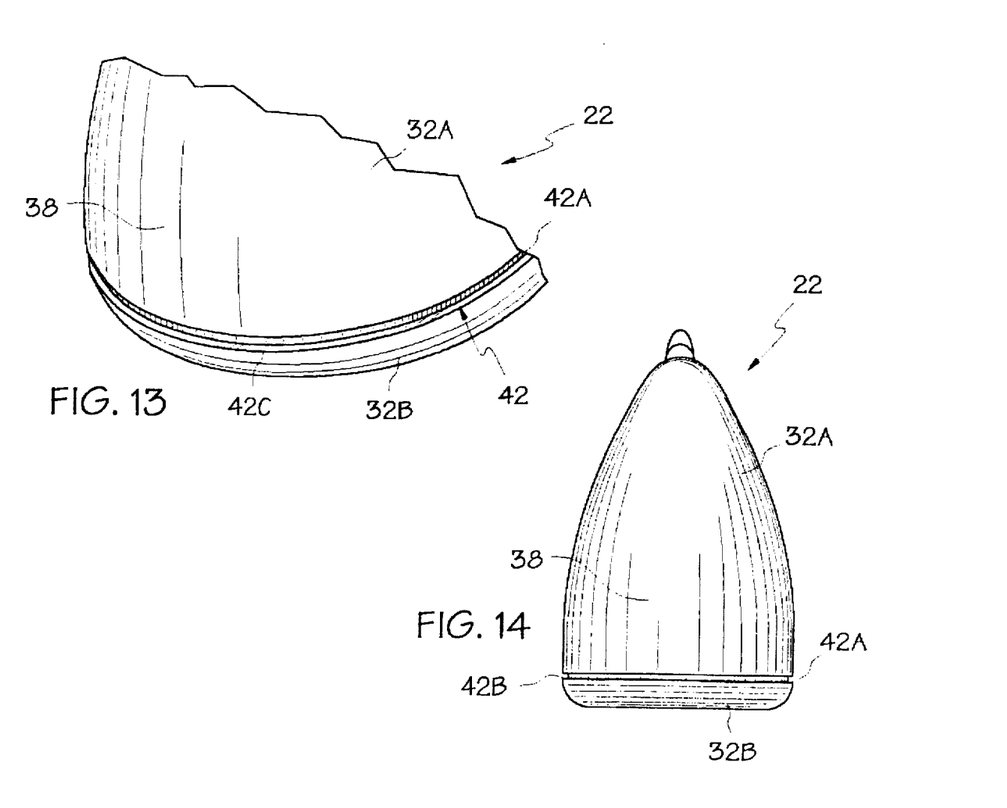
FIG. 13 is an enlarged, fragmentary perspective view showing a portion of the forward end of the mixer body shown in FIGS. 1 through 6.
FIG. 14 is an end elevational view showing the forward end of the mixer body.

As best shown in FIGS. 9 and 12, the splash-blocking portion 23 of the splash guard 20 has a wavy, generally sinusoidal cross-sectional shape around the periphery thereof. The wavy configuration of the splash-blocking portion 23 is provided to add rigidity to the structure and also creates a pleasing ornamental appearance. In addition, the wavy configuration can be designed to create generally circular or semicircular grooves and ridges 25 having different diameters that correspond to different mixing bowl diameters, thereby helping the splash guard 20 seal the upper openings of mixing bowls of various different sizes. Referring to FIG. 8, the splash-blocking portion 23 of the splash guard 20 comprises mutually-spaced side portions 23A and 23B joined by a forward end portion 23C. At their rearward ends, the side portions 23A and 23B are interconnected by an integral retaining strap 26 that provides a more rigid structure by preventing outward flexing of the side portions 23A and 23B.

With reference particularly to FIGS. 7 through 12, the mounting arrangement 24 comprises a vertical, generally U-shaped wall portion 28 having an inwardly-extending horizontal flange, generally designated 30. For reasons that will be discussed below, the flange 30 may be considered to comprise mutually-opposed flange portions 30A and 30B joined by a forward flange portion 30C, the flange portions 30A and 30B being spaced apart by substantially the width of the mixer body 32. The flange 30 is generally U-shaped and, as will be discussed further below, corresponds generally to the shape of the forward end of the mixer body 32.

As mentioned above, the splash-blocking portion 23 and the mounting arrangement 24 are preferably integrally

4 formed to create the one-piece splash guard 20. The splash guard 20 is preferably molded from a dishwasher-safe, translucent polymer material, such as polycarbonate plastic, which permits the mixing process to be viewed during use. Of course, other suitable plastic material, either translucent or opaque, may be used instead.

Referring now to FIGS. 1, 4, 13, and 14, the mixer 22 may be any conventional food mixer modified, if necessary, to have the construction described below. The body 32 of the mixer 22 has opposed sides 34 and 36 (FIG. 4) joined by a forward end 38 and a rearward end 40. The illustrated mixer body 32 is typical of the bodies of many hand-held food mixers in that it is formed from two mating body parts 32A and 32B that enclose the operating parts of the mixer, such as a drive motor (not shown). As common in such conventional mixers, the body parts 32A and 32B, when joined together, form a longitudinally-extending, outwardly open groove, generally designated 42, extending around the outer periphery of the mixer body 32. The groove 42 comprises groove portions 42A and 42B in the sides 34 and 36, respectively, of the mixer body 32, a groove portion 42C in the forward end 38 of the mixer body 32, and a groove portion (not shown) in the rearward end 40 of the mixer body 32. The groove portions 42A and 42B are open to both the forward end 38 and the rearward end 40 of the mixer body 32. As will be described, the groove 42 is used for mounting the splash guard 20 to the mixer body 32.

Figure 2:
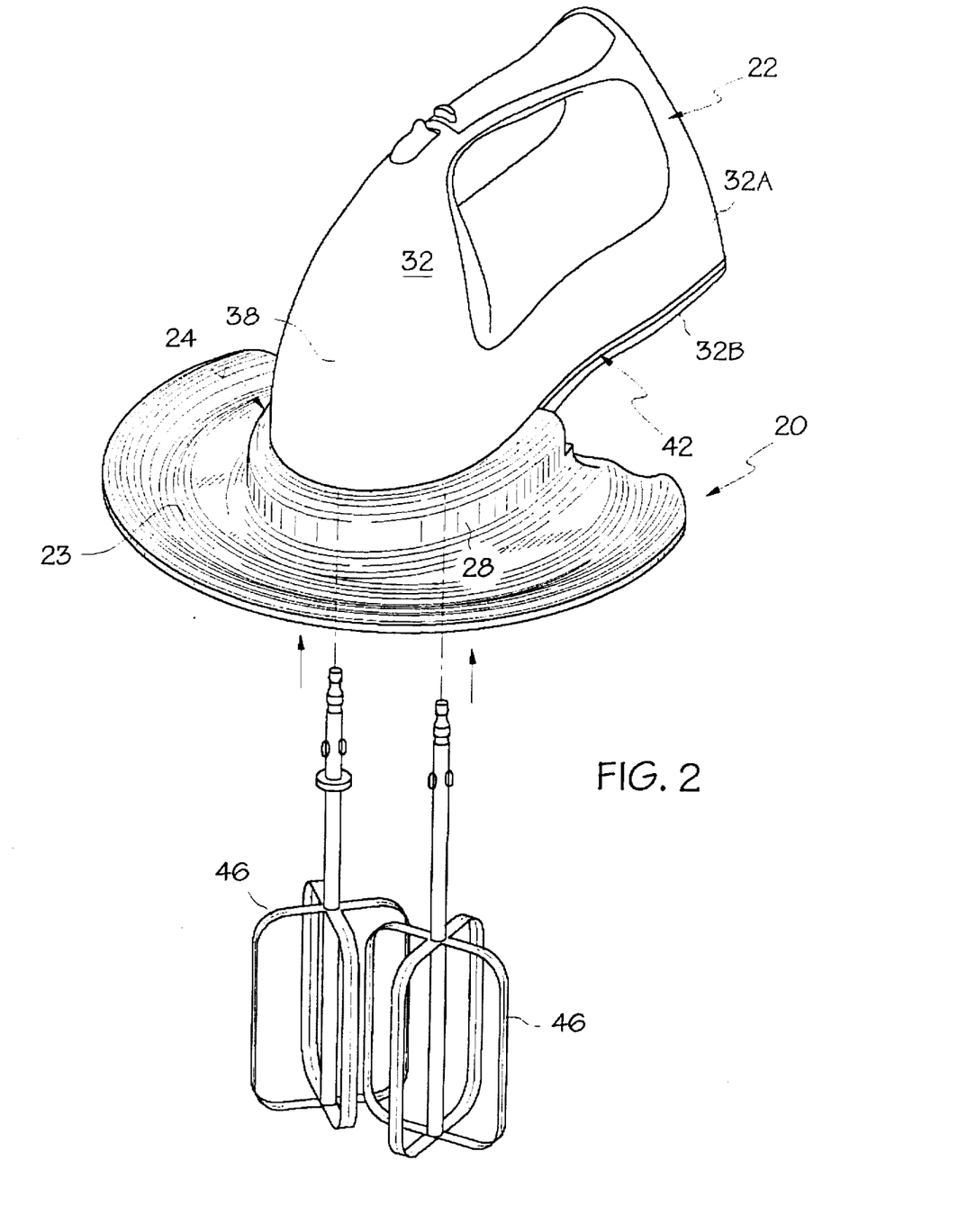
FIG. 2 is a perspective view similar to FIG. 1, but showing the splash guard assembled onto the mixer body.

FIGS. 1 and 2 illustrate the assembly of the splash guard 20 onto the mixer body 32 in accordance with the preferred embodiment of this invention. Prior to assembly, the splash guard is preferably placed on a support surface, such as a countertop (not shown), but it could also be held by hand. Thereafter, as illustrated in FIG. 1, the mixer body 32 is centered above the splash guard 20 with the forward end 38 thereof generally aligned with but above the flange 30 of the splash guard 20. The mixer body 32 is then moved downwardly, as indicated by the arrow in FIG. 1, until the underneath side of the mixer body 32 engages the upper surface of the flange 30 of the splash guard 20. Continued downward pressure is applied to the mixer body 32, which causes the flange portions 30A and 30B to be spread outwardly so that the mixer body 32 is received 10 between the opposed flange portions 30A and 30B. As a result, the flange portions 30A, 30B, and 30C snap into position within the groove portions 42A, 42B, and 42C, respectively, and the splash guard 20 is thus assembled onto the mixer body 32.

Figure 6:
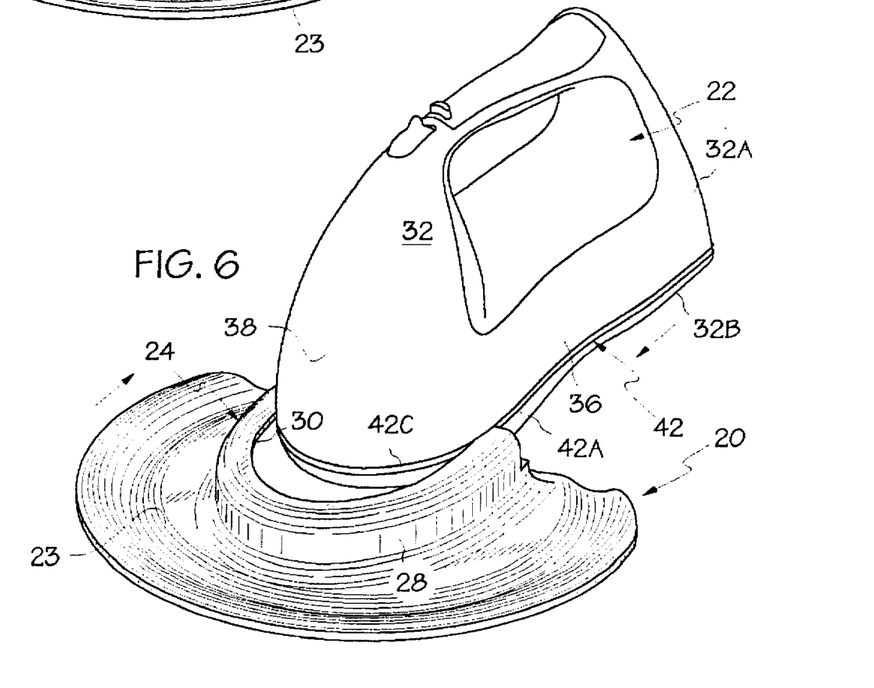
Figure 7:
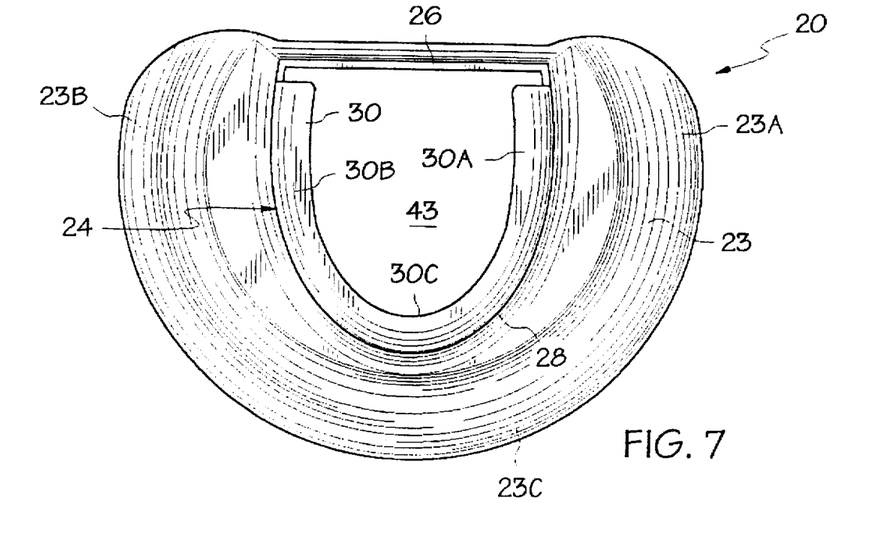
FIG. 7 is a top plan view of the splash guard in accordance with this invention shown in FIGS. 1 through 6.

FIGS. 6 and 7 illustrate an alternative method for assembling the splash guard 20 onto the mixer body 32. As shown in FIG. 6, the splash guard 20 is first positioned in front of the mixer body 32 with the flange 30 of the splash guard 20 aligned with the groove 42 in the mixer body 32. It will be understood, however, that the splash guard could be assembled in accordance with this alternative method onto the rearward end 40 of the mixer body 32, if the splash-blocking portion 23 were appropriately configured. Next, the splash guard 20 and the mixer body 32 are moved toward one another so that the rearward ends of the flange portions 30A and 30B are received in the groove portions 42A and 42B, respectively, as shown in FIG. 7. This can be accomplished by moving the splash guard 20 or the mixer body 32, or both. The splash guard 20 and the mixer body 32 are then further moved together, with the flange portions 30A and 30B sliding in the groove portions 42A and 42B, respectively, until the forward flange portion 30C is received within the groove portion 42C in the forward end 38 of the mixer body 32, which is the configuration shown in FIG. 2.

Figure 3:
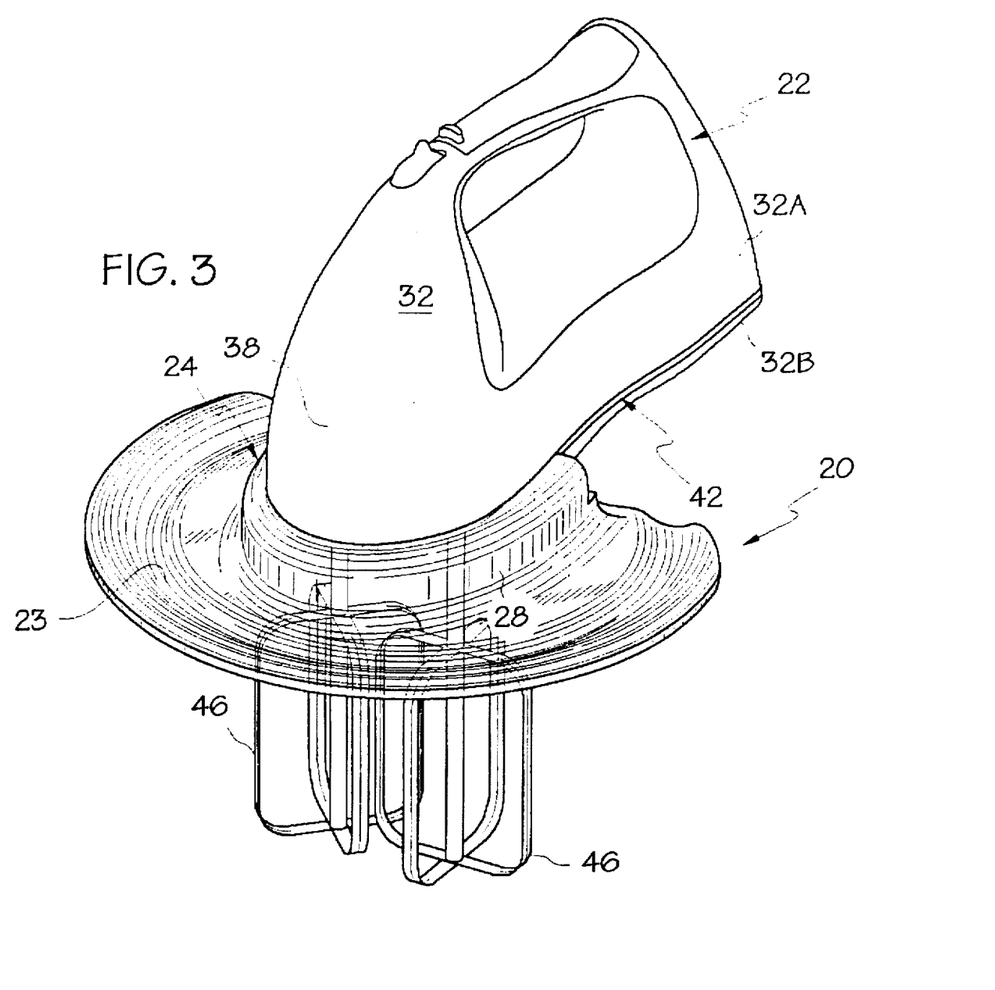
FIG. 3 is a perspective view similar to FIG. 2, but showing the mixer and the splash guard fully assembly and ready for use.
Figure 4:
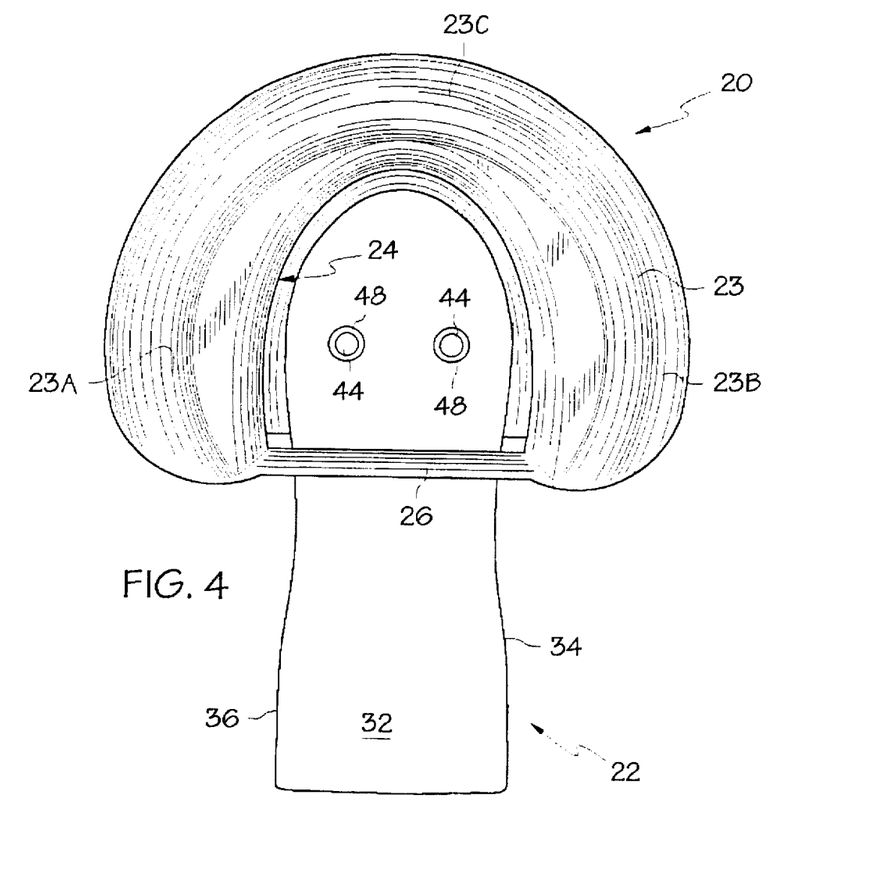
FIG. 4 is a bottom plan view of the mixer body and the splash guard in their fully assembled condition shown in FIG. 2.
Figure 5:
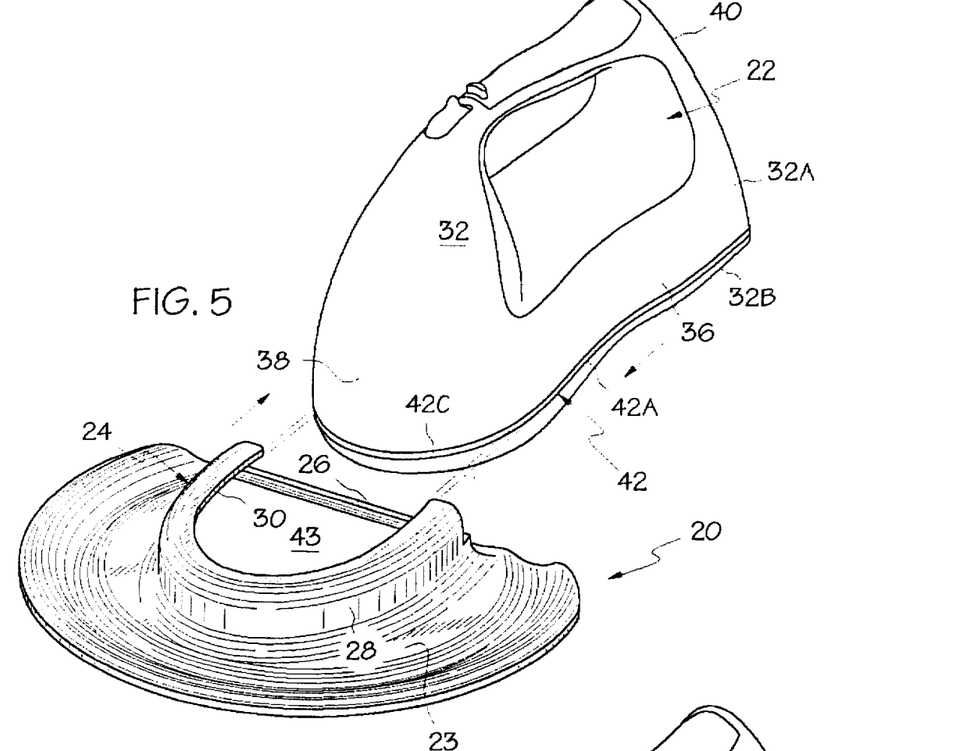
FIGS. 5 and 6 are perspective views similar to FIG. 1 but illustrating an alternative method for assembling the splash guard onto the mixer body. The splash guard is shown partially assembled onto the mixer body in FIG. 6.

With reference to FIGS. 2 through 4, the bottom of the mixer body 32 has provided therein two mixing element drive sockets 44 that receive a pair of conventional mixing elements 46. The mixing elements 46 are not inserted into their respective drive sockets 44 until the splash guard 20 is fully assembled onto the mixer body 32 as shown in FIG. 2. Once the mixing elements 46 are inserted into their respective drive sockets 44, the mixer body 32 and the splash guard 20 is ready for use, as shown in FIG. 3. It will be noted that, in some known mixers, upstanding rings project downwardly around the mixing element drive sockets 44. Such rings are illustrated in FIG. 4 and designated 48 therein. Because the retainer strap 26 of the splash guard 20 moves beneath the mixer body 32 in close proximity to the bottom surface thereof during sliding assembly of the splash guard 20 onto the mixer body 32, as shown in FIGS. 6 and 7, the rings 48, if present, can impede movement of the splash guard 20 to its fully assembled position shown in FIG. 2. Therefore, it may be necessary to slightly tilt the splash guard 20 during part of the sliding assembly process described above to permit the retainer strap 26 to move away from the bottom of the mixer body 32 and past the rings 48.

The splash guard 20 is removed from the mixer body 32 by placing the splash guard on a countertop or the like (not shown) and lifting the rearward end 40 of the mixer body 32 upwardly relative to the splash guard 20. Thereafter, the mixer body 32 can be moved rearwardly relative to the splash guard 20 so that the groove portions 30A and 30B slide along the flange portions 42A and 42B until the mixer body 32 is free from the splash guard 20.

As evident from FIGS. 1 through 3, the mounting arrangement 24 defines an opening or void 43 in the splash guard 20 that substantially corresponds in size and shape to the forward end of the mixer body 32, and the forward end of the mixer body 32 is received in the opening 43 when the splash guard 20 is fully assembled onto the mixer body 32. As a result, the bottom surface of the mixer body 32 also serves to block the splashing or splattering of ingredients from the mixing bowl during mixing. The flange 30 is shaped to closely conform to the shape of the mixer body 32 to prevent any splattering ingredients from passing between the mixer body 32 and the splash guard 20.

The foregoing description is of the preferred embodiment of a splash guard 20 and mixer 22 in accordance with this invention. However, it will be understood that various modifications may be made. For example, the groove portions 42A, 42B, 42C in the mixer body 32 that cooperate with the flanges 30 to secure the splash guard 20 to the mixer body 32 need not be formed at the junction of two body parts secured together to form the mixer body 32 and need not form a unitary groove 42. Instead, the groove portions 42A, 42B, 42C can be specially formed in the mixer body 32 in any suitable manner. This would be the case, for example, if a known mixer design is used that does not already provide groove portions 42A, 42B, and 42C. Likewise, the groove portions that cooperate with the flange 30 can be formed as separate, distinct grooves in the mixer body 32, and they can also be formed at locations other than the sides of the mixer body 32. Of course, the use of a groove 42 formed at the junction of the body parts 32A and 32B is preferred because such groove is present in many existing mixer designs, and therefore, appropriately-configured splash guards 20 in accordance with this invention can be used with such existing mixer designs without modifying the mixer body. More particularly, because many known mixer designs have a longitudinally-extending, outwardly open groove at the junction of their two mating body parts, a splash guard 20 in accordance with this invention can be readily adapted for use with such an existing mixer design by configuring the flange 30 of the mounting arrangement 24 to correspond to the shape and dimensions of the existing mixer design.

One skilled in the art will also recognize that the mounting arrangement 24 in accordance with this invention is useful with splash guards having splash-blocking portions other than the wavy plate configuration shown in the drawings. For example, the mounting arrangement 24 may be used with splash-blocking portions of a splash guard that have a simple, flat plate or disk configuration, as shown in U.S. Pat. Nos. 4,459,811 and 3,960,370, or that has a cup-like configuration, as shown in U.S. Pat. No. 5,556,203. Furthermore, although the illustrated mixer 22 is a handheld mixer, it will be understood that a splash guard 20 in accordance with this invention is also useful with a stand mixer, such as the mixer shown in U.S. Pat. No. Des. 378,649, for example.

Although the presently preferred embodiments of this invention have been described, it will be understood that within the purview of the invention various changes may be made within the scope of the following claims.

Having thus described our invention, we claim:

1. A combined food mixer and splash guard assembly, comprising:

a mixer comprising a body enclosing operating parts of the mixer, said body having a bottom wall and opposed side walls extending upwardly from said bottom wall; and a splash guard adapted to cover at least a portion of the opening of a mixing bowl to prevent ingredients from splashing therefrom during mixing, said splash guard including a mounting arrangement, portions of said mounting arrangement mating with portions of the respective opposed side walls of said mixer body to thereby secure the splash guard to the mixer body above said bottom wall.

2. A combined food mixer and splash guard assembly, comprising:

a mixer comprising a body enclosing operating parts of the mixer and having an outer surface defining mutually-opposed sides of said body; and a splash guard adapted to cover at least a portion of the opening of a mixing bowl to prevent ingredients from splashing therefrom during mixing, said splash guard including a mounting arrangement, portions of said mounting arrangement mating with portions of the respective opposed sides of said mixer body to thereby secure the splash guard to the mixer body, and wherein the outer surface of said mixer body defines an end connecting said sides, and wherein a portion of said mounting arrangement mates with the end of said mixer body to assist in securing the splash guard to the mixer body.

3. A combined food mixer and splash guard assembly, comprising:

a mixer comprising a body enclosing operating parts of the mixer and having an outer surface defining mutually-opposed sides of said body; and a splash guard adapted to cover at least a portion of the opening of a mixing bowl to prevent ingredients from splashing therefrom during mixing, said splash guard including a mounting arrangement, portions of said mounting arrangement mating with portions of the respective opposed sides of said mixer body to thereby secure the splash guard to the mixer body, and wherein said mixer body has a width and each side of said body has an outwardly-open, longitudinally-extending groove therein open to an end of said body, and wherein said portions of said mounting arrangement that mate with said mixer body comprise mutually-confronting flange portions spaced apart by substantially the width of said mixer body, each of said flange portions being received within a corresponding one of the grooves in said mixer body to thereby secure the splash guard to the mixer body.

4. The combination of claim 3 wherein said end is defined by the outer surface of said mixer body and connects said sides, wherein the grooves in said mixer body further extend around said end of said mixer body and join together to form a unitary groove in said mixer body, and wherein said flange portions form a unitary flange having a shape corresponding to the shape of the unitary groove in said mixer body, said unitary flange being received along its entire length within said unitary groove.

5. The combination of claim 3 wherein said mixer body comprises two body parts secured together, and wherein said grooves in the sides of said mixer body are formed at the junction of said body parts.

6. The combination of claim 3 wherein said splash guard comprises a splash-blocking plate member disposed beneath said mixer body.

7. The combination of claim 3 wherein said end is defined by the outer surface of said mixer body and connects said sides, and wherein said splash guard defines an opening that receives said end of said mixer body.

8. The combination of claim 3 wherein said splash guard includes a splash-blocking portion, and said mounting arrangement is integrally formed with said splash-blocking portion.

9. The combination of claim 3 wherein said splash guard includes a splash-blocking portion, said splash-blocking portion comprises a plate member, and wherein at least a portion of said plate member has wavy transverse cross-sectional shape.

10. The combination of claim 9 wherein said wavy portion of said plate member has a generally sinusoidal transverse cross-sectional shape.

11. The combination of claim 3 wherein said mixer is a hand-held mixer.

12. A combined food mixer and splash guard assembly, comprising:

a mixer having a body enclosing operating parts of said mixer, said body having formed therein a pair of mutually-spaced, longitudinally-extending, outwardly-open grooves; and a splash guard comprising a splash-blocking portion adapted to cover at least a portion of the opening of a mixing bowl to prevent the splattering of ingredients therefrom and a mounting arrangement comprising mutually-spaced flange portions that are received within the grooves in said mixer body to secure said splash guard to said mixer.

13. The combination of claim 12 wherein said grooves are formed in respectively opposite sides of said mixer body.

14. A method for assembling a splash guard onto a mixer body having mutually-opposed sides, comprising the steps of:

providing said splash guard with a mounting arrangement comprising mutually spaced flange portions;

locating said splash guard in position adjacent to said mixer body; and providing relative motion between said splash guard and said mixer body to cause the flange portions of said splash guard to mate with the mutually-opposed sides of said mixer body, whereby said splash guard is secured to said mixer body, wherein each side of said mixer body has provided therein a longitudinally-extending, outwardly open groove and wherein said step of providing relative motion causes said flange portions to be received within said grooves.

15. The method of claim 14 wherein said locating step comprising positioning said splash guard beneath said mixer body with said flange portions engaging an underneath side of said mixer body, and wherein said step of providing relative motion comprises forcing said mixer body downwardly against said flange portions to cause said flange portions to snap into position within said grooves.

16. The method of claim 14 wherein said locating step comprised positioning said splash guard adjacent an end of said mixer body with the flange portions aligned with said grooves, and wherein said step of providing relative motion causes said flange portions to slide into said grooves.

* * * * *